(12) United States Patent
Humann

(10) Patent No.: US 9,406,028 B2
(45) Date of Patent: Aug. 2, 2016

(54) EXPERT SYSTEM FOR PREDICTION OF CHANGES TO LOCAL ENVIRONMENT

(71) Applicant: George Loisos, Alameda, CA (US)

(72) Inventor: Christian Humann, Berkeley, CA (US)

(73) Assignee: Christian Humann, Berkeley, CA (US)

( * ) Notice: Subject to any disclaimer, the term of this patent is extended or adjusted under 35 U.S.C. 154(b) by 382 days.

(21) Appl. No.: 13/798,050

(22) Filed: Mar. 12, 2013

(65) Prior Publication Data

US 2014/0067733 A1 Mar. 6, 2014

Related U.S. Application Data

(60) Provisional application No. 61/696,052, filed on Aug. 31, 2012.

(51) Int. Cl.
*G06N 5/04* (2006.01)
*G06N 99/00* (2010.01)
*G05B 13/02* (2006.01)

(52) U.S. Cl.
CPC .............. *G06N 99/005* (2013.01); *G05B 13/02* (2013.01); *G06N 5/04* (2013.01); *G06N 5/046* (2013.01)

(58) Field of Classification Search
None
See application file for complete search history.

(56) References Cited

U.S. PATENT DOCUMENTS

| | | | |
|---|---|---|---|
| 5,572,635 A | 11/1996 | Takizawa et al. | |
| 5,663,621 A | 9/1997 | Popat | |
| 6,817,399 B2 | 11/2004 | Berman et al. | |
| 7,417,397 B2 | 8/2008 | Berman et al. | |
| 7,625,151 B2 | 12/2009 | Li et al. | |
| 7,684,022 B2 | 3/2010 | Berman et al. | |
| 7,977,904 B2 | 7/2011 | Berman et al. | |
| 8,016,016 B2 | 9/2011 | Berman et al. | |
| 8,120,292 B2 | 2/2012 | Berman et al. | |
| 8,125,172 B2 | 2/2012 | Berman et al. | |
| 8,248,014 B2 | 8/2012 | Berman et al. | |
| 8,276,642 B2 | 10/2012 | Berman et al. | |
| 8,319,956 B2 | 11/2012 | Berman et al. | |

(Continued)

FOREIGN PATENT DOCUMENTS

| WO | 2011129473 A1 | 10/2011 |
|---|---|---|
| WO | 2012005461 A2 | 1/2012 |

OTHER PUBLICATIONS

Fairchild, et al., Brightness, lightness, and specifying color in high-dynamic-range scenes and images, SPIE Proceedings, vol. 7867, Image Quality and System Performance VIII, Jan. 24, 2011, pp. 1-14.*

(Continued)

*Primary Examiner* — Wilbert L Starks
(74) *Attorney, Agent, or Firm* — Patent Law Offices of Michael E. Woods; Michael E. Woods

(57) ABSTRACT

Disclosed is a photometer that employs high dynamic range (HDR) image processing and manipulation algorithms for capturing and measuring real-time sky conditions for processing into control input signals to a building's automated fenestration (AF) system, daylight harvesting (DH) system and HVAC system. The photometer comprises a color camera and a fitted fish-eye lens to capture 360-degree, hemispherical, low dynamic range (LDR) color images of the sky. Both camera and lens are housed in a sealed enclosure protecting them from environmental elements and conditions. In some embodiments the camera and processes are controlled and implemented by a back-end computer.

12 Claims, 4 Drawing Sheets

(56) References Cited

U.S. PATENT DOCUMENTS

| | | |
|---|---|---|
| 8,432,117 B2 | 4/2013 | Berman et al. |
| 8,482,724 B2 | 7/2013 | Berman et al. |
| 8,525,462 B2 | 9/2013 | Berman et al. |
| 8,587,242 B2 | 11/2013 | Berman et al. |
| 2007/0253768 A1 | 11/2007 | Li et al. |
| 2007/0291252 A1 | 12/2007 | Berman et al. |
| 2009/0020233 A1 | 1/2009 | Berman et al. |
| 2009/0222137 A1 | 9/2009 | Berman et al. |
| 2009/0254222 A1 | 10/2009 | Berman et al. |
| 2010/0116443 A1 | 5/2010 | Berman et al. |
| 2010/0157427 A1 | 6/2010 | Berman et al. |
| 2010/0198420 A1 | 8/2010 | Rettger et al. |
| 2010/0294440 A1 | 11/2010 | Li et al. |
| 2011/0220091 A1 | 9/2011 | Kroyzer |
| 2011/0290432 A1 | 12/2011 | Berman et al. |
| 2012/0126737 A1 | 5/2012 | Berman et al. |
| 2012/0133315 A1 | 5/2012 | Berman et al. |
| 2012/0143356 A1 | 6/2012 | Berg-Sonne et al. |
| 2012/0155704 A1 | 6/2012 | Williams et al. |
| 2012/0201456 A1 | 8/2012 | El-Mahdy et al. |
| 2012/0285630 A1 | 11/2012 | Berman et al. |
| 2013/0054662 A1 | 2/2013 | Coimbra |
| 2013/0057937 A1 | 3/2013 | Berman et al. |
| 2013/0063065 A1 | 3/2013 | Berman et al. |
| 2013/0081767 A1 | 4/2013 | Berman et al. |
| 2013/0180676 A1 | 7/2013 | Berman et al. |

OTHER PUBLICATIONS

"President Obama Visitis Solar Power Plant Using Technology Developed by UC San Diego Engineers", published Mar. 21, 2012 [online] and retrieved from http://www.jacobsschool.ucsd.edu/news/news_releases/release.sfe?id=1184> on Jan. 9, 2014.

Long, C.N., J.M. Sabburg, J. Calbo, and D. Pages, 2006: Retrieving cloud characteristics from ground-based daytime color all-sky images. J. Atmos. Oceanic Technol, 23, 633-652, vol. 23, May 2006.

Tregenza PR. 1987. Subdivision of the sky hemisphere for luminance measurements. Lighting Research and Technology. vol. 19:13-14.

Perez, R., Ineichen, p. and Seals, R. (1990) Modeling daylight availability and irradiance components from direct and global irradiance. Solar Energy 44, 271-89.

Ardeshir Mahdavi et al., "Elements of a Simulation-Assisted Daylight-Responsive Illumination Systems Control in Buildings" Building Simulation 2005, Ninth International IBPSA Conference, pp. 393-700, Montreal, Canada, Aug. 15-18, 2005.

Bojana Spasojevic et al., "Sky Luminance Mapping for Computational Daylight Modeling" Building Simulation 2005, Ninth International IBPSA Conference, pp. 1163-1169, Montreal, Canada, Aug. 15-18, 2005.

Extended European Search Report for European Patent Application No. 13833226.7 dated May 9, 2016.

\* cited by examiner

EXPERT SYSTEM FOR PREDICTION OF CHANGES TO LOCAL ENVIRONMENT

CROSS REFERENCE TO RELATED APPLICATIONS

This application claims benefit of U.S. Application No. 61/696,052 filed 31 Aug. 2012, the contents of which is hereby expressly incorporated in its entirety for all purposes.

BACKGROUND OF THE INVENTION

The present invention relates generally to a building automation control system, and more specifically, but not exclusively, to use of a high dynamic range (HDR) sky map for predictive control.

This disclosure relates to a photometric device controlled wirelessly or directly by a microcontroller and/or a back-end computer system to control a building's automated daylighting fenestration system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

It has been determined that the use of daylight harvesting (DH) to replace or supplement electric lighting in buildings can result in significant energy and demand savings as well as improve comfort and visual performance. For example, DH may be accomplished using lighting control systems that are able to dim or switch electric lighting in response to changing daylight availability. High performance fenestration systems are a necessary element of any successful daylighting design that aims to reduce lighting energy use. New fenestration technologies have been developed that aim at controlling the intensity of the incoming solar radiation, its interior distribution and its spectral composition, as well as thermal losses and gains. For best performance these fenestration systems often incorporate automated components such as, but not limited to, shades, Venetian blinds, interior/exterior fixed and adjustable louvers, electrochromic glazings, and optical components, such as, light redirecting devices, in order to respond to the dynamic nature of daylight and its component parts of direct sun, diffuse sky and exterior objects reflecting on to the fenestration. These controls are with respect to openings or portals in a building or wall envelope, such as for windows, doors, louvers, vents, wall panels, skylights, storefronts, curtain walls, and slope glazed systems.

Automated fenestration (AF) systems use a combination of photometers and computer algorithms to measure and predict real time sun and sky conditions in order to control how these systems modulate natural, daylight illumination in the interior spaces of buildings while preventing glare, heat-gain and brightness discomfort for the building's occupants. Current fenestration control systems, like SolarTrac by MechoShade, employ an array of exterior mounted radiometers and photometers to measure sky conditions and sky brightness' from a building's roof top as well as from specific façade orientations (e.g. north, east, south, west). The measured radiometric values from the roof are compared against published theoretical values for specific latitudes to determine if the sky condition is clear or overcast. When the sky is cloudy the shades are raised. When clear and sunny the system adjusts the shades of each fenestration orientation according to the solar geometry for that orientation and the desired depth of direct sun allowed to enter in to the space. The photometric values of sky brightness, measured vertically from discrete façade orientations, are compared against specified luminance levels to determine if shades need to be closed for control of visual and thermal comfort.

Unfortunately these systems require multiple radiometers and photometers, each capable of taking only very specific measurements (i.e. irradiation, luminance or illuminance) of only the global component of the sky (i.e. the diffuse sky and solar contribution are measured together). Without the ability to sample the sky directionally and discreetly clouds cannot be discerned from the clear sky component to determine such metrics as amount of cloud coverage, cloud size and brokenness of cloud coverage. These measurements are necessary for approximating and predicting if, when, and for how long the sun is or may be occluded by clouds. Without the latter capabilities, AF systems tend to either not react in time, or to overreact when control is or is not needed.

Additionally, the façade mounted photometers inability to separately measure the direct solar component and diffuse sky component at different facade orientations impedes their ability to control for glare and direct gain. The effects of these two components on visual glare and thermal gain are different, requiring each to be measured separately. Sun hitting a photometer at an angle to its receiving surface's orientation will cause a high photometric reading, but may not be a source of glare if the angle is such that the circumsolar region is out of the visual field of the occupants. In contrast, a relatively lower photometric reading of a bright, overcast sky in the visual field of building occupants may be high enough to be a source of visual discomfort.

Furthermore, the integration of photometers with fenestration systems is costly and complicated limiting its market share and the benefits associated with it.

What is needed is a system and method for measurement and accurate prediction of sky/weather influence on building systems that respond to sky-related environment changes.

BRIEF SUMMARY OF THE INVENTION

Disclosed is a system and method for a system and method for measurement and accurate prediction of sky/weather influence on building systems that respond to sky-related environment changes.

The following summary of the invention is provided to facilitate an understanding of some of the technical features related to predictive building automation control systems, and is not intended to be a full description of the present invention. A full appreciation of the various aspects of the invention can be gained by taking the entire specification, claims, drawings, and abstract as a whole. The present invention is applicable to other sky-influenced predictive control systems, as well as other environments such as indoor and outdoor lighting systems.

An apparatus including an HDR capturer for obtaining an image of a local environment; a mapper for processing said image to extract a plurality of metrics and performance data of said local environment; and an expert learning system, responsive to said plurality of metrics and performance data to generate a near real-time prediction of a local change in said local environment and initiating a change in a local-environment-influencing system to counter said local change.

A computer-implemented method, including a) producing an HDR image for a local environment; b) extracting, using a computing system, a plurality of metrics and performance data of said local environment from said HDR image; and c) predicting, using said computing system, a local change in said local environment responsive to said plurality of metrics and performance data of said local environment from said HDR image.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for a system and method for measurement and accurate prediction of sky/weather influence on building systems that respond to sky-related environment changes. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
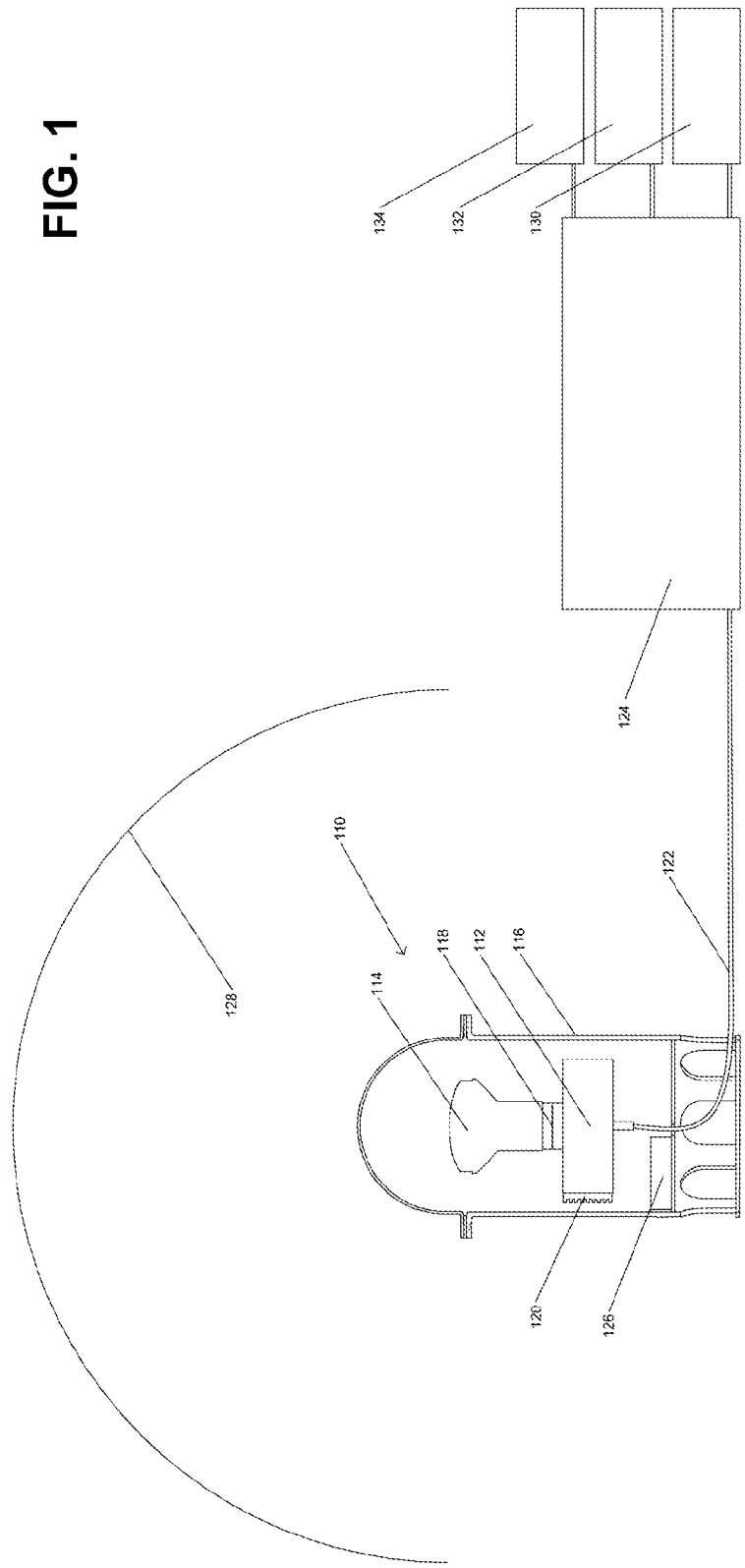
FIG. 1 illustrates an embodiment of a HDR sky mapping system.

One embodiment of the HDR photometer system 110 is illustrated in FIG. 1 (section view). As depicted therein, the broad aspects of the embodiment 110 includes at least one interchangeable camera 112 capable of capturing a sequence of LDR color images (or frames) 214 at different shutter speeds and/or apertures and having a minimum of one fisheye lens 114 capable of providing a 360-degree azimuthal view and 180-degree or more horizon-to-horizon view of the sky. The camera 112 and lens 114 are housed in an environmentally protected enclosure 116 so as to permit the camera 112 to capture a 360-degree azimuthal view and 180-degree or more horizon-to-horizon view of the sky 128.

The camera 112 is operatively connected 122 to a back-end computer 124 that instructs the camera 112, via software, to capture a sequence of LDR images 214 of the sky 128 at different shutter speeds at a preset interval of time. Typically a sequence of five, exposure and or aperture (F-stop) bracketed images are captured at a rate of one sequence per two minutes but one may reduce this or increase this number of brackets and rate at which they are taken depending on user data needs. The color, exposure bracketed images are transmitted to the computer 124 for processing into a single HDR radiance map 220 of the sky.

The preferred camera 112 used in this invention is a digital camera capable of being controlled and interfaced 122 physically with a computer 124 (e.g. RS-232, USB, IEEE 1394, TCP/IP and GIGE) or wirelessly (e.g. Bluetooth, Wi-Fi, ZigBee and wireless USB or others). However other embodiments may use other camera types such as, but not limited to, digital or analog video cameras where the video signal is outputted via an analog or digital signal to a computer with an appropriate interface board. The signal will then be input into a frame grabber board mounted on a computer (not shown).

In still another embodiment of the present invention a weatherproof camera 112 and lens 114 is employed without the need for an environmentally protected enclosure 116.

In another embodiment of the present invention the camera 112 is cooled and heated directly to maintain the camera's 112 temperature within the manufacturer's recommended operating temperature ranges by attached thermoelectric (e.g., Peltier cooler/heater) modules 118 controlled by a temperature sensor. Other means of cooling and heating the camera may include, but are not limited to, fans, heat sinks and small electric heaters.

In still another embodiment of the present invention the camera 112 or lens 114 are fitted with a filter 120 (e.g. Neutral Density filter, Polarizing filter, Near Infra Red filter and colored filters). These filters may be used to protect the camera's image sensor from the possible harmful effects of the sun and or to enhance specific aspects of the images produced.

In still another embodiment of the present invention the camera 112 is operatively connected 122 to a microprocessor 126 enclosed in the same environmentally protected enclosure 116. The microprocessor 126 takes the place of the back-end computer 124 mentioned previously.

In still another embodiment of the present invention a radiometer and/or photometer (not shown) are employed inside or in close proximity to the environmentally protected enclosure 116 to capture global values of sun and sky irradiation and or illuminance respectively.

Figure 2:
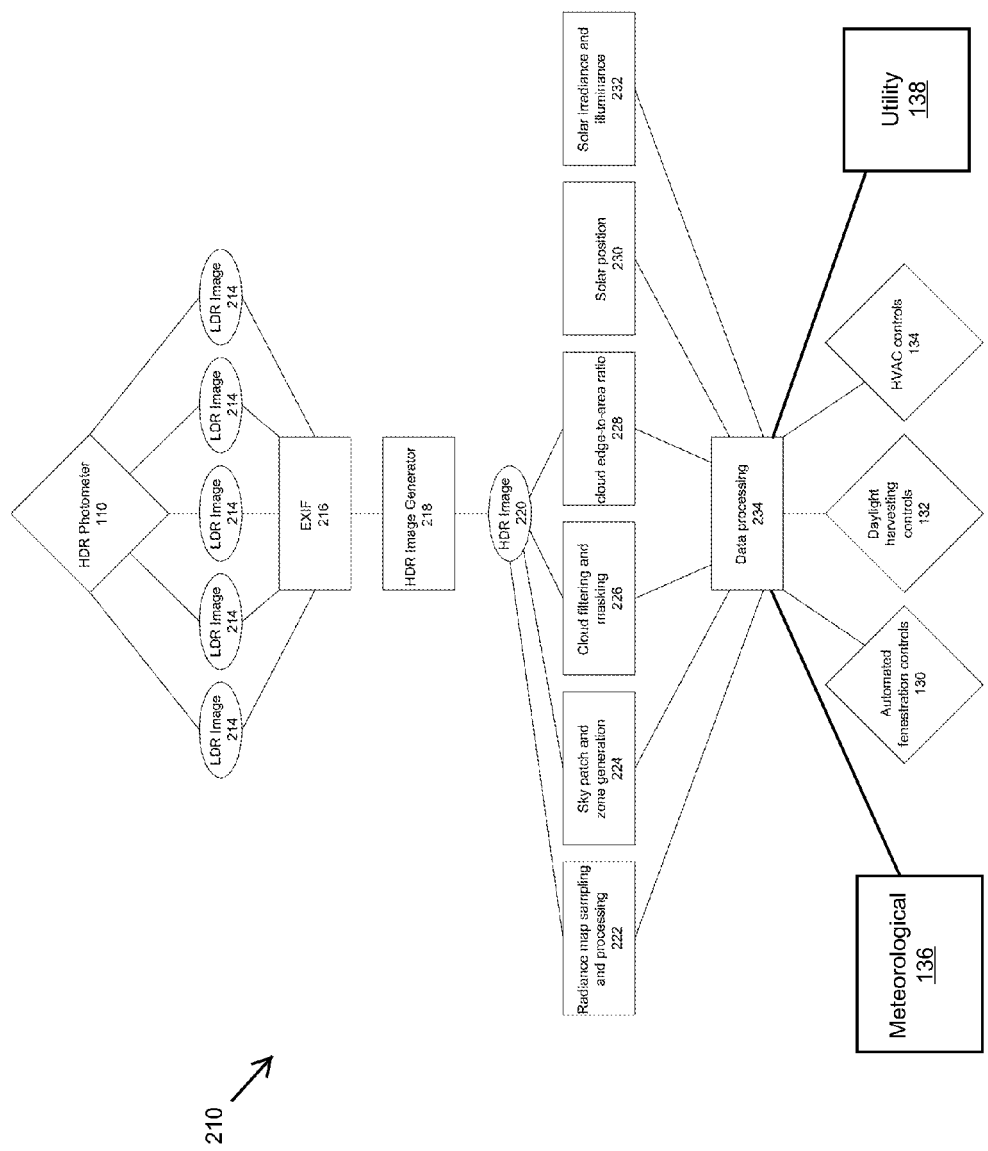
FIG. 2 illustrates a system architecture for an automated control system including environment prediction.

FIG. 2 conceptually illustrates the software architecture 210 employed to control the system 110 as well as the procedures and transformations employed for calculating cloud, sun and sky photometric data that's later processed into control signals sent to the AF 130, DH 132 and HVAC 134 systems. Once triggered by a user-set time interval the camera control software (CCS) 212 instructs the camera 112 to capture a single LDR image 214 at the camera's 112 fastest exposure setting. The captured image is analyzed to determine if the average pixel brightness meets a predetermined, minimum value appropriate for inclusion in the processing of the final HDR radiance map 220. If the image is determined to be too dark then the camera is instructed to capture another image at a lower exposure until a captured image meets the minimum, average pixel brightness. Once an acceptable image is captured more images are acquired, each at sequentially longer exposure times. This embodiment captures 5 LDR images 214, however more or less than this can be captured to meet a user's needs. Also, in some embodiments of the present invention both exposure and or aperture brackets, rather than exposure alone, may be used when capturing the LDR sequence of images. The preferred CCS 212 for this embodiment is the Astro IIDC program for Apple Computer's operating system OSX by Aupperle Services and Contracting. However, other camera control programs are available for OSX as well as other computer operating systems including, but not limited to Windows and Linux.

After a sequence of exposure bracketed, LDR images 214 are acquired from the system 110 by computer 124, metadata information EXIF 216 of each LDR image 214 is updated, if necessary, with the exposure speed, camera ISO speed and the lens f-stop setting. Next, an HDR image generator 218 processes the LDR images and EXIF 216 into an HDR radiance map 220 (e.g., a "sky map"). The preferred HDR image processing software used in HDR image generator 218 includes "HDRgen" written by Greg Ward of Exponent Corporation. The pixel data in the HDR radiance map contain real-world luminance values equivalent to those that might be measured using a spot photometer. Once processed the HDR radiance map 220 is run through several algorithmic procedures to extract quantitative cloud, sky and solar data. Procedures 222-223 are also used independently from the HDR radiance map 220 for calculating solar position and global and direct values of horizontal and vertical solar irradiation and/or illuminance values for the buildings location and the time and date of HDR radiance map 220.

In procedure 222 the HDR radiance map's 220 pixel values are processed and sampled for calculating the diffuse, horizontal illumination (lux or 1 m/m2) value at the photometer as well as the highest recorded pixel value captured in the solar region of the HDR radiance map. The highest recorded pixel value is divided by the highest achievable sensor pixel value, for the particular camera used, in order to provide a reduction and correction factors for use in later procedures such as global illumination, global irradiation and the calculation of the amount by which the sun's direct beam component is diffused by cloud cover.

In procedure 224 the HDR radiance map 220 is subdivided into discreet patches similar to the method described by Tregenza PR. 1987. Subdivision of the sky hemisphere for luminance measurements. Lighting Research and Technology. Vol 19:13-14. These patches are then reassembled into specific zones of the sky. The number of zones generated is chosen by the user based on the number of building façade orientations. Each of these reassembled zones contains the radiance pixel values for that portion of the sky visible by a building occupant looking through a building's fenestration towards one of the specific building orientations. Pixels not within these specific view boundaries are given a value of zero. Finally, an average sky brightness (cd/m2) is calculated for each of these zone (pixels values of zero are ignored).

In procedure 226 the HDR radiance map 220 is filtered and masked to isolate clouds from sky using a fixed threshold algorithm for determining fractional sky cover in a way similar to that presented by Long, C. N., J. M. Sabburg, J. Calbo, and D. Pages, 2006: Retrieving cloud characteristics from ground-based daytime color all-sky images. J. Atmos. Oceanic Technol, 23, 633-652. Specifically pixels with a red-to-blue signal ratio greater than a predetermined, fixed value are classified as cloud, while lower values of the R/B are classified as cloud-free. Once all cloud/clear pixels have been determined, the fractional sky cover is calculated as the number of cloud pixels divided by the total number of pixels in the HDR radiance map 220 (any border masks surrounding the fish-eye, HDR radiance map 220 are ignored).

In procedure 228 the HDR radiance map 220 is filtered to isolate pixels on the cloud/clear-sky boundaries to determine the cloud edge-to-area ratio. Specifically the number of pixels on the cloud/clear-sky boundaries are divided by the total number of pixels within all clouds. This value indicates average cloud size and brokenness of cloud coverage. A high edge-to-area ratio is indicative of broken clouds of small diameter, while a smaller ratio results from extended clouds.

In procedure 230 the solar profile angle is calculated for the location, time and date of the HDR radiance map 220 for all building façade orientations. The solar profile angle is derived from the altitude and azimuth angles of the sun's position.

In procedure 232 theoretical, clear sky, solar irradiance and illuminance values are calculated for the building's location and time and date of the HDR radiance map 220 on both the horizontal plane and the vertical planes of the building's façades orientations. The algorithms used in these calculations are similar but not specific to the methods described by Perez, R., Ineichen, p. and Seals, R. (1990) Modeling daylight availability and irradiance components from direct and global irradiance. Solar Energy 44, 271-89, hereby expressly incorporated by reference. These theoretical values are then adjusted by factoring them with the calculated value for solar region's measured-pixel/brightest-pixel-achievable ratio from procedure 222. The resultant values are approximations of real-time, solar illuminance and irradiance relative to the current sky conditions. Adding the solar, horizontal illuminance value to the measured value of diffuse horizontal illuminance from procedure 222 gives global horizontal illuminance.

In procedure 234 calculated data from the above procedures are processed into control signals sent to the building's AF 130, DH 132 and HVAC 134 systems. For the AF 130 system, sky information is quantified (and saved for future calculations) for determining whether clouds are occluding the solar region and, if so, by what amount the direct sun is being diffused. When occluded and the HDR map's solar region measured-pixel/brightest-pixel-achievable ratio from procedure 222 is below a predetermined amount then values for percent sky overcast, the amount of cloud brokenness, cloud location, cloud direction of movement (determined through comparison with previously saved results) and the sun's path are calculated. These results are processed and compared against previously saved results for determining how long and, in the case of many broken clouds, how frequently the sun will be occluded. When the calculated period of time or frequency at which the sun will be occluded is above a user-defined threshold, then sky brightness at all fenestration orientations are calculated and compared against a predetermined threshold level for visual glare. Based on these calculated cloud conditions and measured sky brightness readings the AF 130 controls are signaled to respond (e.g. shading systems that would otherwise be drawn or closed to control direct sun and or thermal gain are opened at windows not oriented towards a bright sky glare source). Where electrochromic glass or other phase change glass is used in the AF 130 system, the cloud prediction algorithm signals the AF 130 controls to change the glass's phase or state of tint (to account for the inherent time lag period associated with these changes) in anticipation of clearing skies and direct sun.

When the sun is determined to be un-occluded by clouds, vertical solar irradiance (W/m2) and sky brightness on all fenestration orientations are calculated and compared against predetermined threshold levels for solar heat gain and visual glare. In addition, current and previously saved results for cloud coverage and distribution are analyzed for determining if current cloud location, size, brokenness, and direction of movement may occlude the sun within a predetermined period of time relative to the solar path of the sun. Based on these measured and calculated results the AF 130 controls are signaled to respond by adjusting the fenestration to predetermined glare control presets or to the profile angle of the sun relative to the fenestration's orientation and user-set depth of direct sun desired to enter the space. Where electrochromic glass is used in the AF 130 system, the cloud prediction algorithm signals the AF 130 controls to change the glass's state of tint (to account for the inherent time-lag associated with these changes in tint level) in anticipation of the advancing clouds and occluded solar region.

For the DH 132 system, measured and calculated data from the above procedures signals the DH 132 system when the measured and calculated daylight values reach a predetermined level to signal a change in electric lighting switching or dimming. The DH 132 system is initially calibrated on-site using handheld photometers for each of the building's floor levels.

For the HVAC 134, calculated values from procedure 232 for vertical, global irradiation on the building's facades orientations are used to determine solar heat gain entering the building. These calculated values inform the HVAC system of current thermal loads as well as projected loads based on the cloud prediction algorithm in procedure 234.

For meteorological system 136 measured and calculated data will be made available in a larger context (multiple devices over a larger geographical area) over the internet or other communications system that will be able to provide a high resolution of sky related phenomena (e.g., cloud cover, solar radiation, and the like) to allow an understanding of that data in real time to allow microclimate prediction. The combination of this data plus readily available meteorological data will allow expert systems to be able to time amounts of radiation, precipitation and wind conditions at a microclimatic level. A microclimate is a local atmospheric zone where the climate differs from the surrounding area. The term may refer to very small areas, for example a garden bed, or as large as many square miles. Microclimates exist, for example, near bodies of water which may cool the local atmosphere, or in heavily urban areas where brick, concrete, and asphalt absorb the sun's energy, heat up, and reradiate that heat to the ambient air: the resulting urban heat island is a kind of microclimate.

For utility system 138, architecture 210 provides advance information of building performance and energy requirements for a predetermined time in the future. For example, a prediction that in the very near future a noon-time sun will emerge from behind heavy cloud cover (or that the noon-time sun will become occluded by heavy cloud cover), and that this condition may persist for a particular amount of time. Based upon other occupancy, use, and modeling information associated with the building, this advance data allows the utility to quantitatively, in near real-time, understand and respond to energy demand increases/decreases. The scope of this understanding is not limited to the building and its micro-climate, but may be representative of other nearby building energy requirements and expected changes. Of course architecture 210 may include a plurality of systems 110 may be distributed strategically across many buildings and allow the utility to have an even larger aggregate near real-time map of upcoming aggregated energy demand with enough time that the utility may respond appropriately (in increasing output to avoid energy shortage or decreasing output to save costs) among other possible response modalities.

Figure 3:
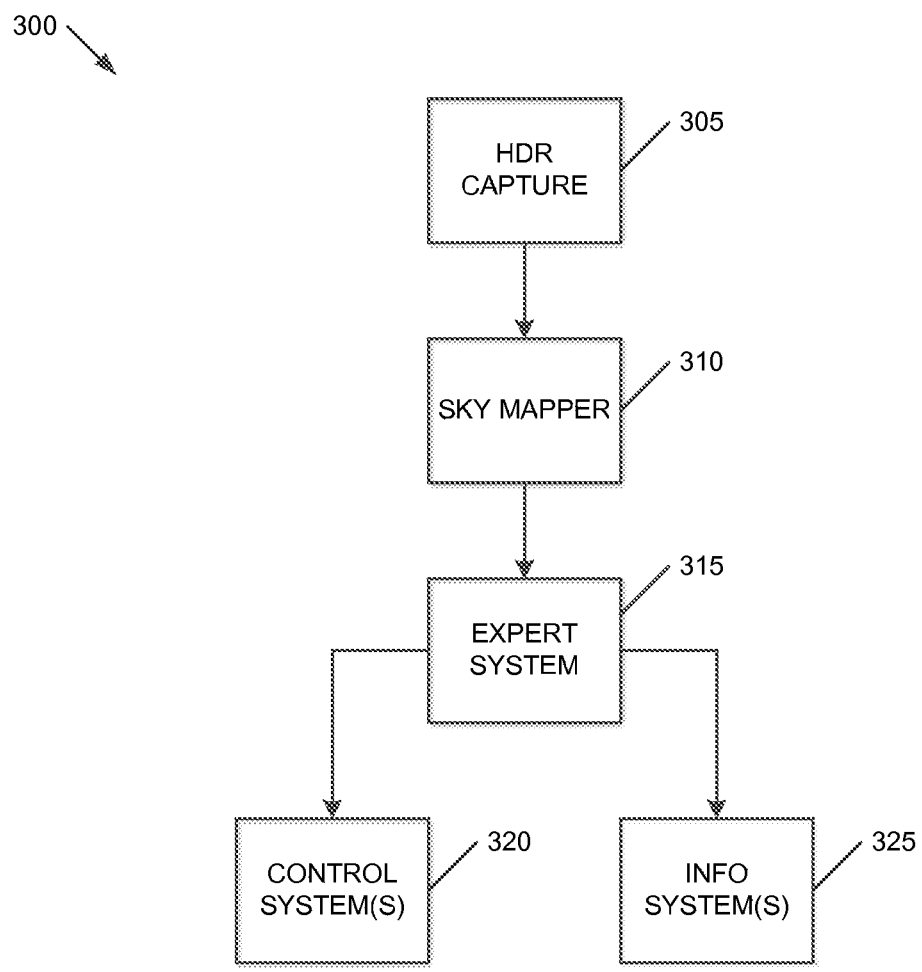
FIG. 3 illustrates a generic environment-informed predictive control system.

FIG. 3 illustrates a generic environment-informed predictive control system 300, of which system 110 is a particular example. System 300 includes an HDR image acquisition subsystem (e.g., HDR capture) 305 that obtains, either through operation of one or more imaging systems as described herein, or use of other suitable data, an HDR image of the sky/local environment. Suitable data varies based upon implementation, but preferably includes near real-time image acquisition sufficient for the desired prediction/forecast window of sky/local environment events.

System 300 also includes a sky mapper 310 that processes the HDR image to extract metrics and characterizations of the sky/local environment. These metrics include elements important to the prediction/forecasting such as, for example, procedures 222-232 shown in FIG. 2. In some implementations, sky mapper 310 may have additional or fewer elements than described herein.

System 300 includes an expert system 315 (also referred to as a learning system) that uses the metrics and characterizations provided by sky mapper 310 in one or more models and predictive systems. These models and predictive systems may be simple or quite complex depending upon the particular use. In some implementations for example, expert system 315 includes a model of a thermal performance of a building in response to various environment loads, operational and lead time requirements for building automation systems 320 (e.g., automated fenestration, daylight harvesting, and HVAC control(s)) or information collection/production 325. In addition, a horizon-to-horizon path of the sun, local buildings and their influence/input into important variables, and other specific information of the building and its operation in the local environment that are important to expert system 315 are used as necessary or desirable. Most preferably expert system 315 is implemented as a learning system to develop and improve prediction and forecasting as it studies how the building and its subsystems react to various parameters it measures and/or calculates.

Control system(s) 320 often benefit from advance input of up-coming sky/local environment events because of lead-time to achieve a desired response. For example, an electrochromic window may take 15 minutes to darken sufficiently in response to a command change. Expert system 315 provides control system 320 for the electrochromic window with advance information enabling it to be in a proper mode in response to a particular event. Expert system 315 informs control system 320 to darken at least 15 minutes before the sun conditions change in any way that would inform its darkness characteristic. In another instance a mechanical cooling system may take some time to alter the thermal sensation of an interior space. Advance warning may allow the system to gently cool the space as it heats up as opposed to trying to remove the heat once the space is warm enough to trigger a thermostat.

Information system(s) 325 aggregate and/or transmit measured/calculated data. Stored information may be used to improve expert system 315 or characterize building or a local micro-climate that includes the building. Transmission of measured/calculated data, particularly in near real-time enables superior energy and lighting management, particularly of the building and other appropriate areas that react similarly to the transmitted data.

Figure 4:
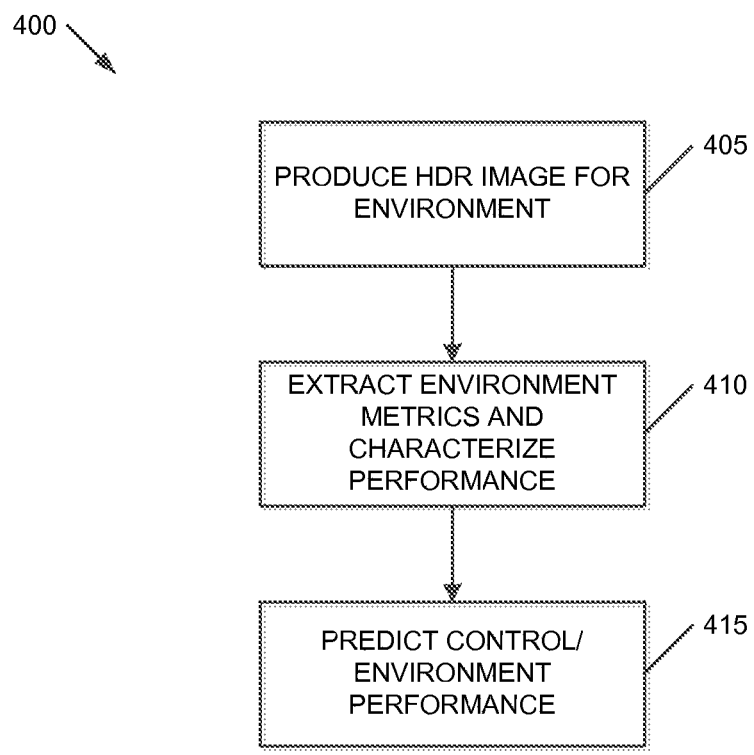
FIG. 4 illustrates a flowchart of a generic environment-informed predictive control process.

FIG. 4 illustrates a flowchart of a generic environment-informed predictive control process 400. Process 400 is preferably implemented by system 110 or 310 or other similar system. Process 400 begins with a step 405 of producing an HDR local environment image (e.g., a series of sets of sky images for an building). After step 405, process 400 extracts environment metrics and characterizes performance of the environment and elements in the environment at step 410. For example, determine where the sun is in the sky, whether there is behind cloud cover, how the cloud cover affects the sunlight with respect to the building, and when will the sun emerge from behind the cloud cover. Process 400 next predicts control requirements and/or environment performance at step 415. While these are often related, they are not always the same as sometimes process works in cooperation with a local control system and other times the predictions/forecasts are used in other ways, some of those ways may be a remote control system The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus comprising:
    an HDR (high dynamic range) capturer configured to obtain an image of a local environment;
    a mapper processing said image and extracting a plurality of metrics and performance data of said local environment; and
    an expert learning system, responsive to said plurality of metrics and performance data generating a near real-time prediction of a local change in said local environment and initiating a change in a local-environment-influencing system to counter said local change.

2. The apparatus of claim 1 wherein said local environment includes a sky view from a building exterior, said sky view including a near real-time characterization of a sun, a sun location, and a path of said sun in said sky view, and a position, a velocity, an acceleration, and an opacity of a sun-occluding object that influences said near real-time prediction by said expert system.

3. The apparatus of claim 2 wherein said sun-occluding object includes a cloud disposed in said sky view along said path of said sun.

4. The apparatus of claim 2 wherein said HDR capturer includes an HDR photometer.

5. The apparatus of claim 4 wherein said HDR photometer includes a camera configured to capture a plurality of sequences of low dynamic range (LDR) color images, each image of a particular sequence having one of a different aperture or a different shutter speed as compared to other images of said particular sequence, said camera capturing said sequence of images through a field of view accessed by a fish-eye lens of said camera, said field-of-view configured to provide a 360-degree azimuthal view and a 180-degree or more horizon-to-horizon view of said sky view.

6. The apparatus of claim 5 wherein each said sequence includes five LDR color images and each said sequence is captured approximately every two minutes.

7. A computer-implemented method, comprising:
   a) producing an HDR (high dynamic range) image for a local environment;
   b) extracting, using a computing system, a plurality of metrics and performance data of said local environment from said HDR image; and
   c) predicting, using said computing system, a predicted local change in said local environment responsive to said plurality of metrics and performance data of said local environment from said HDR image, wherein said predicted local change is in advance of an actual local change in said local environment wherein said steps a)-c) are included in a control system for a building, wherein said building includes an automated climate control responsive to said control system, and wherein said predicted local change is processed into control signals for said control system which operates said automated climate control to reduce a magnitude of said actual local change or a rate of change of said actual local change.

8. The computer-implemented method of claim 7 wherein said automated climate control includes an automated fenestration system for one or more portals of said building.

9. The computer-implemented method of claim 7 wherein said automated climate control includes a heating, ventilation, and air conditioning (HVAC) system for one or more occupancy zones within said building.

10. The computer-implemented method of claim 7 wherein said automated climate control includes a daylight harvesting system for one or more occupancy zones within said building.

11. A computer-implemented method, comprising:
    a) producing an HDR (high dynamic range) image for a local environment;
    b) extracting, using a computing system, a plurality of metrics and performance data of said local environment from said HDR image; and
    c) predicting, using said computing system, a predicted local change in said local environment responsive to said plurality of metrics and performance data of said local environment from said HDR image, wherein said predicted local change is in advance of an actual local change in said local environment wherein said steps a)-c) are included in a distributed meteorological system having a plurality of data gathering locations distributed over a geographical region having a plurality of microclimates greater in number than a number of said data gathering locations, wherein each said data gathering location performs steps a)-c), and wherein a statistical processing of said predicted local changes for one or more of said microclimates.

12. A computer-implemented method, comprising:
    a) producing an HDR (high dynamic range) image for a local environment;
    b) extracting, using a computing system, a plurality of metrics and performance data of said local environment from said HDR image; and
    c) predicting, using said computing system, a predicted local change in said local environment responsive to said plurality of metrics and performance data of said local environment from said HDR image, wherein said predicted local change is in advance of an actual local change in said local environment wherein said steps a)-c) produce a predicted local change for a first building connected to a power grid operated by a utility company, wherein said predicted local change for said first building is accompanied by a change in an energy demand by said first building through said power grid wherein said change in said energy demand determines whether said utility changes an energy production for said power grid, and wherein said predicted local change is provided to said utility allowing said utility to modify said energy production consistent with said actual local change.

* * * * *